Oct. 20, 1942.   J. E. HAMPTON   2,299,321
ENGINE TEMPERATURE REGULATOR
Filed Oct. 14, 1940
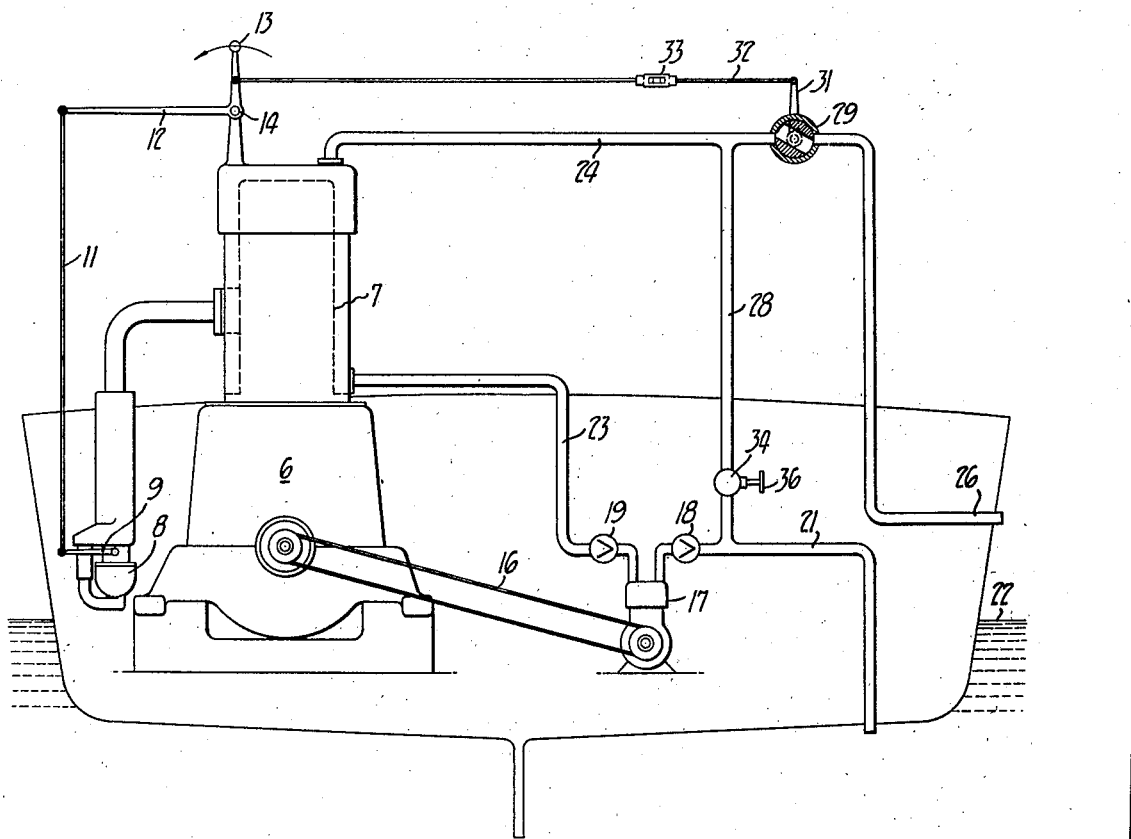
INVENTOR
John E. Hampton
BY
Marcus Lothrop
ATTORNEY Patented Oct. 20, 1942

2,299,321

UNITED STATES PATENT OFFICE 2,299,321

ENGINE TEMPERATURE REGULATOR

John E. Hampton, Vallejo, Calif., assignor to Yuba Manufacturing Company, San Francisco, Calif., a corporation of California Application October 14, 1940, Serial No. 361,034

4 Claims. (Cl. 123—178)

My invention relates to means for maintaining an optimum operating temperature of an internal combustion engine cylinder and is particularly concerned with such matters when the engine is installed in a boat or is utilized in a comparable marine environment.

Internal combustion engines as now used, particularly in fishing boats and the like, are relatively slow speed in operation and are utilized for long periods of time for trolling. It is the custom to circulate by force pump ocean water, for example, through the engine cylinder jacket and to discharge such cooling water overboard through the exhaust. Since these engines must be reliable in the extreme the operation of the pump is customarily gauged by observing the discharge of the used cooling water over the side or stern of the boat. In this way a positive visual check is had concerning the operation of the cooling water pump. In late years with modern fuels difficulties of serious consequences have been encountered with cylinder wall condensation due to the fact that the engine sometimes operates too cold. This is not true when the engine is operating under full load but does occur at light loads as in trolling, especially when such idling or trolling speeds are maintained for many hours. Thermostatic means for controlling the temperature immediately suggest themselves but practical trials under operating conditions indicate that they are far too delicate and are adversely affected by the mineral content and other material occurring in sea water. Another factor is that fishing boats, for example, operating off the coast of Lower California or out of San Diego customarily operate in water which is considerably warmer than that encountered by fishing boats operating off Puget Sound or off the coast of Alaska for example. Considerable practical difficulty has been encountered in providing a fairly uniform or standard system which would operate properly under such varying conditions.

It is therefore an object of the invention to provide an engine temperature regulator which is simple and reliable for marine use.

Another object of the invention is to provide an engine temperature regulator which does not interfere with the present reliable cooling system.

A further object of the invention is to provide an engine temperature regulator which is effective in a particular locality in which it is to be utilized for optimum performance.

The foregoing and other objects of the invention are attained in the embodiment illustrated in the drawing, in which the figure shows one arrangement of the engine temperature regulator of my invention as installed in a boat, most of the parts being diagrammatically represented and some being shown in transverse cross section.

In its preferred form the engine temperature regulator of my invention is for use with a marine engine installed in a boat and provided with a force pump which draws water from below the water line and forces it through the engine cooling jacket from which it flows through another duct overboard, so that a visual indication of water circulation may be had. To afford control of the temperature I provide a by-pass pipe between the discharge duct and the intake duct and provide restrictions in the by-pass duct and in the discharge duct, the latter of which is connected with the engine speed regulator so that the flow of water through the jacket is regulated to afford the desired temperature.

In the form of the invention which is disclosed in the drawing and which is representative or diagrammatic only, since details of installation will vary in individual instances, there has been shown an internal combustion engine 6 provided with the customary cooling jacket 7 and receiving its fuel through a carburetor 8 which has a throttle control lever 9, so that the speed of operation of the engine can be regulated. The throttle control lever 9 is connected by a rod 11 to an arm 12 of a main throttle lever 13 disposed on a pivotal mounting 14 for convenient operation by the boatman.

Driven by the engine 6, as diagrammatically illustrated by the drive chain 16, is a positive displacement force pump 17 provided with an inlet check valve 18 and an outlet check valve 19. The inlet check valve 18 is situated in an intake duct 21 extending from the valve to a point below the water line 22 and outside of the hull, whereas the valve 19 is disposed in a pipe 23 connecting the discharge of the pump 17 to the jacket 7. Thus, as the engine 6 operates the pump 17 is operated in accordance therewith and inspirates the cooling liquid from the surrounding water and discharges it into the jacket 7. The volume of water flowing through the jacket 7 correspondingly is in direct proportion to the speed of the engine 6. This, of course, assumes that all of the pumping conditions remain constant throughout the entire speed range and over the life of the operation. This assumption is not borne out in practice since very many factors, such as wear, accretions in the pipe and other factors prevent the circulation of water through the jacket 7 from being always substantially in accordance with the engine speed. In fact, the variation therefrom is often quite substantial.

From the water jacket 7 the used cooling water is conducted to discharge through a discharge duct 24 which goes overboard with an outlet 26 above the water level 22. The performance of the pumping system can be judged by visual observation of the amount of water discharging from the pipe 26. Sometimes the pipe 26 intersects the engine exhaust pipe prior to going overboard but that does not affect the operation of the remaining part of the system.

As so far described, the water circulating system is substantially a standard installation. In accordance with my invention, I preferably provide a by-pass duct 28 which extends from the discharge duct 24 to the intake duct 21 just in advance of the pump 17, or ahead of such pump. In order to insure flow through the by-pass duct 28 from the discharge duct 24 back to inlet duct 21 I provide a restriction 29 in the form of a valve, which can be regulated and which is located in the discharge duct between the intersection therewith of the by-pass duct 28 and the outlet 26. Also, I preferably provide the variable valve 29 with an operating lever 31 connected by a rod 32 to the main throttle control lever 13 and establish the relationship in such a way that the valve 29 is almost but not quite closed when the throttle valve as regulated by the lever 9 is substantially closed.

In this way when the engine is operating slowly the relatively warm water discharged through the pipe 24 is diverted through the by-pass duct 28, back into the inlet pipe 23 so that a relatively high temperature is maintained within the jacket 7. This insures that deleterious condensation in the cylinder is precluded and thus accomplishes the desired purpose. Yet when the engine is more heavily loaded upon opening of the throttle lever 9 by means of the control lever 13, the valve 29 is also opened and permits a large part of the hot discharge water to go overboard through the outlet 26.

But at no time is the valve 29 completely closed. Under any and all circumstances some flow therethrough takes place so that the boat operator can by inspection of the outlet 26 always make sure that the pump is in operation. To make sure that the valve 29 can be appropriately related to the lever 13 so as not to be completely closed an adjusting turn buckle 33 is interposed in the rod 32.

Since the minimum opening through the valve 29 affords sufficient resistance so that ordinarily the flow of water through the outlet 26 for visual indication would be almost insignificant, I provide in the by-pass duct 28 a resisting valve 34 which is about like the valve 29 but is provided with an adjusting screw 36 so that it can be set at any desired point. The valve 36 is not ordinarily tampered with once it has been installed but is utilized to compensate not only for the flow resistance of the various pipes but also to compensate for the different temperature of ocean water with which the installation normally operates. That is to say, upon installation the valve 36 is ordinarily set once and for all but if the boat operates in different waters at different temperatures the valve 36 can be adjusted to take care of that change. Normally, however, and once the turnbuckle 33 has been set, the circulating system is fixed and stable and the general result is that only sufficient water is circulated through the water jacket 7 to maintain adequate cooling, this circulation varying directly with the speed of operation of the engine 6, which in marine installations is a substantial indication of the load upon the engine.

In accordance with this scheme, therefore, the standard water circulating system on a marine engine is left substantially unchanged, the operator always has a visual indication as to the effectiveness and operability of the water pump, the possibility of engine cylinder condensation is eliminated and all of the parts are positively actuated and are not deleteriously affected by marine conditions, so that an exceedingly reliable arrangement is provided.

I claim:

1. An engine temperature regulator for use with an engine installed in a boat and having a water jacket, comprising a force pump driven by said engine and discharging into said jacket, an intake duct extending from below the water line to the intake of said pump, a pipe extending from the outlet of said pump to said jacket, a discharge duct extending from said jacket overboard above the water line, means for controlling the speed of said engine, a variable restriction in said discharge duct, means for varying said restriction and controlling said speed simultaneously, a by-pass duct joining said discharge duct between said jacket and said restriction with said intake duct ahead of said pump, and a variable restriction in said by-pass duct.

2. An engine temperature regulator for use with an engine installed in a boat and having a speed regulator and a water jacket, comprising means for supplying water to said jacket, means for discharging overboard water from said jacket, means for conjointly operating said speed regulator and for varying the resistance to flow through said discharging means, and means between said jacket and said controllable means for conducting water from said discharging means to said supplying means.

3. An engine temperature regulator for use with an engine having a water jacket, and having a speed regulator comprising means for supplying said jacket with water, means for discharging water from said jacket, a valve in said discharging means, a by-pass duct extending from said discharging means between said jacket and said valve to said supplying means, and means for operating said valve and said speed regulator together.

4. An engine temperature regulator for use with an engine having a water jacket comprising a force pump adapted to discharge into said jacket, means for varying the speed of said engine and force pump, an intake duct extending to the intake of said pump, a pipe extending from the outlet of said pump to said jacket, a discharge duct extending from said jacket, a valve in said discharge duct, means for conjointly varying the speed of said force pump and varying the effect of said valve, and a by-pass duct joining said discharge duct between said jacket and said valve with said intake duct.

JOHN E. HAMPTON.